United States Patent

Kittsteiner et al.

[11] Patent Number: 6,108,939
[45] Date of Patent: Aug. 29, 2000

[54] BLOWER NOZZLE

[75] Inventors: Hans-Jürgen Kittsteiner, Ruhpolding; Michael Maetze, Neukirchen, both of Germany

[73] Assignee: Bruckner Maschinenbau GmbH, Germany

[21] Appl. No.: 09/194,027

[22] PCT Filed: Jun. 5, 1997

[86] PCT No.: PCT/EP97/02921

§ 371 Date: Nov. 19, 1998

§ 102(e) Date: Nov. 19, 1998

[87] PCT Pub. No.: WO97/47449

PCT Pub. Date: Dec. 18, 1997

[30] Foreign Application Priority Data

Jun. 12, 1996 [DE] Germany ............... 196 23 471

[51] Int. Cl.7 .................................. F26B 17/00
[52] U.S. Cl. ................... 34/585; 34/638; 34/639; 34/641; 34/656
[58] Field of Search .................. 34/576, 580, 585, 34/619, 638, 639, 640, 641, 643, 656; 226/7, 95, 97; 239/553.5, 561, 568

[56] References Cited

U.S. PATENT DOCUMENTS

| | | |
|---|---|---|
| 3,823,488 | 7/1974 | Houben et al. ............... 34/643 |
| 4,170,075 | 10/1979 | Scott . |
| 4,271,602 | 6/1981 | Grolms ....................... 34/634 |
| 4,347,960 | 9/1982 | Gageur . |
| 4,767,042 | 8/1988 | Daane . |
| 5,054,212 | 10/1991 | Ishikawa ..................... 34/634 |
| 5,156,312 | 10/1992 | Kurie ......................... 226/97 |
| 5,395,029 | 3/1995 | Kurie ....................... 34/641 X |
| 5,749,164 | 5/1998 | Bowden ..................... 34/641 |
| 5,970,626 | 10/1999 | Schmidt et al. ............... 34/631 |

FOREIGN PATENT DOCUMENTS

| | | |
|---|---|---|
| 0 377 311 | 7/1990 | European Pat. Off. . |
| 253 666 | 11/1988 | German Dem. Rep. . |
| 30 07 752 | 9/1981 | Germany . |
| 30 35 417 | 4/1982 | Germany . |
| 36 26 171 | 4/1987 | Germany . |
| 36 42 710 | 10/1987 | Germany . |
| 37 04 910 | 10/1987 | Germany . |
| 38 15 211 | 1/1992 | Germany . |

OTHER PUBLICATIONS

Patent Abstracts of Japan vol. 9, No. 121 (M–382), May 25, 1985 & JP 60 008037 A (Mitsubishi Jukogyo K.K.), Jan. 16, 1985, see abstract & Database WPI Section Ch, Week 8509 Derwent Pulbications Ltd., London, GB: Class AF, AN 85–052284 (09) & JP 60 008 037 A (Mitsubishi Heavy Ind. Co. Ltd.), Jan. 16, 1985 see abstract.

Patent Abstracts of Japan vol. 16, No. 440 (M–1310), Sep. 14, 1992 & JP 04 153011 A (Sekisui Chem. Co. Ltd.) May 26, 1992, see abstract & Database WPI Section Ch, Week 9227 Derwent Publications Ltd., London, GB; Class AP, AN 92–224016 (27) & JP 04 153 011 A (Sekisui Cem. Ind. Co. Ltd.), May 26, 1992 see abstract.

*Primary Examiner*—Stephen Gravini
*Attorney, Agent, or Firm*—Nixon & Vanderhye PC

[57] ABSTRACT

A blower nozzle, especially for heating or cooling web-like materials, especially plastic foil webs, comprises at least one distribution chamber (11) and often a supply chamber (7). In the improvement, between the supply chamber (7) and the distribution chamber (11) there is at least one other chamber (9), so that the treatment gas can flow from the supply chamber (7) to the at least one further chamber (9) via an overflow aperture arrangement (17) and from the further chamber (9) via another overflow aperture arrangement (23) into the distribution chamber (11) for further conveyance to the outlet aperture arrangement (27).

18 Claims, 1 Drawing Sheet

U.S. Patent   Aug. 29, 2000   6,108,939
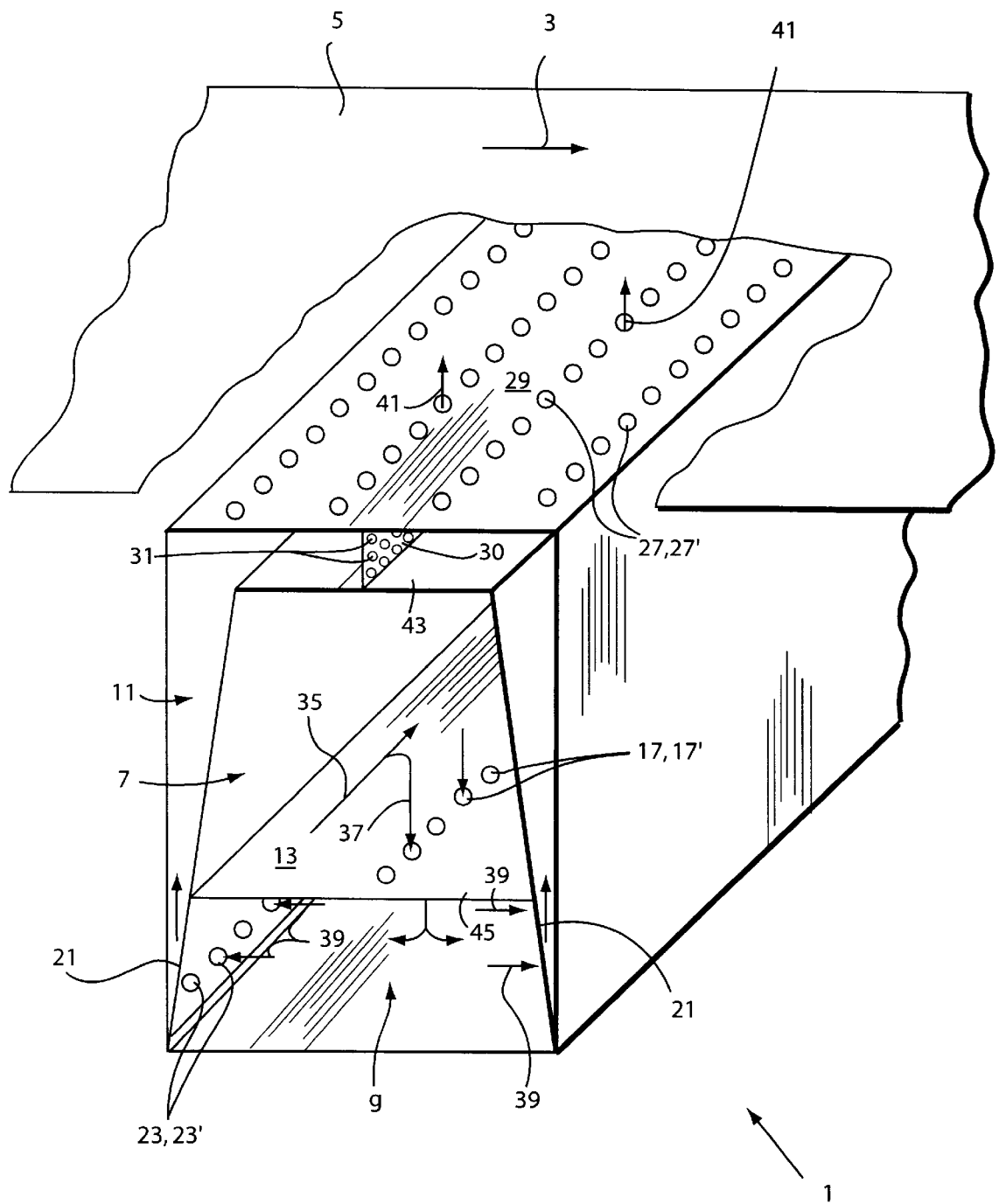

BLOWER NOZZLE

This application is the U.S. National phase of International Application PCT/EP97/02921 which designated the U.S.

BACKGROUND OF THE INVENTION

The invention relates to a blower nozzle for heating and cooling web-like materials.

Blower nozzles of this type are used, for example, for heating or cooling web-like materials, in particular in the production of plastic foil. In this case, the blower nozzle is arranged transversely, i.e. generally perpendicularly, to the take-off direction of the material web, and thus transversely to the web running direction, above and/or below the material web.

It is particularly important for the foil process that the outflow from the nozzles is even, since uneven heating of the plastic foil during processing can have negative effects on the thickness profile. This is because slightly warmer regions are stretched more and are thus thinner than relatively colder plastic foil regions, which then obtain a somewhat thicker foil cross section. Uneven heating or cooling of the foil also leads, however, to a deterioration in the flatness of the final product.

Even blowing is particularly crucial for the production of ultrathin films or foil whose thickness can be reduced down to about 0.4 $\mu$m.

Various proposals have already been made to even out the outflow speed for heating or cooling continuous webs of material, in particular plastic foil webs. EP-A1-0 377 311 proposes a blower nozzle having two supply chambers which are seated next to one another, extend transversely to the take-off direction of the material web, are provided, in each case opposite one another, with a supply aperture for the hot gas of the hot air, and are closed at their respective, opposite end. The cross section of the respective supply chamber decreases in a web-shaped manner from the supply aperture to the opposite, closed end parallel, in the side view, to the take-off direction of the plastic foil web. A distribution chamber is then seated below the two supply chambers arranged next to one another, with the result that the opposite hot gas flowing in at the end side via the supply chambers can then pass via overflow apertures, arranged between the two supply chambers and the distribution chamber, essentially transversely to the plane of the material web into the distribution chamber and from there can emerge in a transverse direction transversely to the plastic foil web via outlet apertures situated at the bottom.

Since two supply chambers which are symmetrically opposite to the central longitudinal direction of the plastic foil web are thus provided, it is possible for an equal distribution of pressure to be obtained which, even if it is not even is nevertheless at least symmetrical with respect to the cross section of the plastic foil web (i.e. transversely to the take-off direction thereof), thus enabling the plastic foil web to be subjected to the blowing action of air or gas as evenly as possible over the entire width of the blower nozzle.

However, this requires an increased outlay since two supply ducts are provided, which have to be supplied with hot gas or cooling gas (generally air) in each case on opposite sides, i.e. on both sides of the material web being advanced, in each case via a separate supply aperture. However, this results in relatively poor accessibility to the blower nozzle in particular if it is installed in an oven.

An essentially two-part veneer web drier has been disclosed, for example, in DE 30 35 417 A1. The nozzle box includes a perforated plate which runs obliquely from bottom to top, is provided with holes and divides the nozzle box into a pressure space and a suction space, the suction space being connected to the intake side and the pressure space being connected via the delivery side to circulating fans. Even a veneer web drier of this type does not result in the desired, completely even distribution and/or even gas outlet speed of the supplied hot gas flow over the entire length of the nozzle box.

In the case of the blowing device which is disclosed in DE 37 04 910 C1 or DE 36 26 171 C1 and is intended for blowing a treatment medium onto a material web moving in the longitudinal direction, just one chamber is provided which is simultaneously used as the supply and distribution chamber. In order to be able to supply hot gas at the two opposite, end supply apertures from just one side of the material web, some of the hot gas is supplied via a separate supply duct to the opposite, end connection aperture of the distribution chamber, via the additional supply duct, and is conducted into the distribution chamber.

A corresponding principle for a nozzle box for a device for the heat treatment of webs of endless fabric, in particular textile webs, has been disclosed to this extent in DD 253 666 A1 too.

Suspension nozzles have been disclosed, for example, in US patents U.S. Pat. Nos. 5,156,312 and 5,395,029. The medium can emerge from a supply chamber via two lateral control chambers upward in the direction of the material web which is being guided past and is to be treated, it being possible for the individual, lateral control chambers to be opened or closed in such a manner that an air flow in the direction of the take-off direction of the material web to be treated, a flow direction in the opposite direction thereto, or a symmetrical flow direction can be produced to the extent that some of the gas flowing out is deflected in the take-off direction of the material web and in the opposite direction.

Finally, DE 38 15 211 C2 has disclosed the design of a suspension nozzle having a plurality of chambers, which nozzle, however, because of its design results in the web of endless fabric W coming to lie between the outlet nozzles in a cross-sectionally rippled manner. A suspension nozzle of this type in particular cannot be used in the production of plastic foil webs which is advanced via tenter hooks acting laterally on the plastic foil web and is optionally stretched in the longitudinal and/or transverse direction.

SUMMARY OF THE INVENTION

The object of the present invention is therefore to provide a comparatively simply designed blower nozzle for treating, in particular heating and/or cooling continuous webs of material, which blower nozzle makes possible uniform distribution and/or an even outlet speed of the supplied treatment medium (generally hot or cool air flow) over the entire length of the nozzle box, i.e. over the entire width of the material web being advanced.

In an amazingly simple manner, the present invention provides a blower nozzle which ensures a clearly improved, uniform distribution and even gas outlet speed from the nozzle box into the surrounding operational space.

To this end, the invention provides at least a three chamber system which comprises, on the one hand, a supply chamber for supplying the treatment gas (heating or cooling gas), a distribution chamber from which the gas ultimately emerges in the direction of the material web being advanced, by means of a component directed transversely to said web, and a further chamber arranged between the supply and the distribution chamber, preferably in the form of a pressure compensation chamber.

The at least one further chamber serves to compensate for the pressure of the gas supplied via the supply chamber. In the distribution chamber the dynamic pressure of the gas or air flow can then ultimately be changed into stagnation pressure resulting in further evening out of the pressure, thereby enabling even distribution of the gas flow to the outlet apertures.

In a particularly preferred embodiment of the invention provision is made for the overflow apertures in each case to be arranged from one chamber to the next chamber in such a manner that the plane of the aperture directions and hence the flow directions of the gas through these apertures are aligned, with respect to the overflow apertures at the transition to the next chamber or to the alignment of the outlet apertures—via which the treatment gas emerges in the direction of the material web—in each case transversely to one another, i.e. are aligned preferably perpendicularly or essentially perpendicularly to one another. As a result, the gas flow is in each case deflected in the transition from the supply chamber to the pressure compensation chamber, from the pressure compensation chamber to the distribution chamber and from the distribution chamber via the outlet apertures in the direction of the material web to be treated, as a result of which a high-grade even gas outlet speed from the nozzle box and a high-grade even distribution of the supplied hot gas flow over the entire width of the material web being advanced can be achieved.

Altogether, in particular when realizing preferred embodiments, the following advantages can thus be achieved:

An even distribution of the supplied gas flow over the entire width of the material web to be treated or the entire blower nozzle.

An even gas outlet speed from the nozzle box into the surrounding operational space.

A constant quality of distribution from the blower nozzle or the nozzle box with regard to the gas outlet speed at different volumetric flows, with deviations better than
±4% at $V_{max}$
±10% at $V_{min}$
where $$\frac{V_{max}}{V_{min}} \geq \frac{4}{1}.$$

A more even heat transmission coefficient between nozzle box and operative surface outside the nozzle box (for the outlet apertures to the material web it being possible for the parameters of aperture size, aperture pitch and distance between the material web and the outlet apertures of the air nozzle to be matched optimally to one another).

A low pressure loss between a fan connected upstream of the blower nozzle and the outlet apertures of the blower nozzle (of the nozzle box); further improvements can still then be achieved, the area ratios of the duct cross sections and chamber cross sections are matched to one another and if the chamber geometries are also designed in a customary manner such that they are a favorable in terms of flow.

A high-grade insensitivity of the blower nozzle to changed operating temperatures.

Ensuring that the treatment medium impacts on the material web to be treated in an as perpendicular a manner as possible.

The nozzle geometry can be used for nozzle boxes of differing length, even for ovens, i.e. in particular for oven constructions having a differing working width. It is not necessary to change the nozzle design in the case of a differing oven width or differing width of the material web.

Low Production costs for the blower nozzle.

BRIEF DESCRIPTION OF THE DRAWINGS

The FIGURE is a schematic perspective representation of a blower nozzle embodying the invention.

DETAILED DESCRIPTION OF THE INVENTION

The invention is explained in more detail below with reference to an exemplary embodiment.

The drawing shows, in a schematic, perspective representation, a blower nozzle having a nozzle box 1 which extends in its longitudinal direction transversely to the take-up direction 3 of a material web 5. In the exemplary embodiment shown, the material web 5 comprises a plastic film which is subjected to longitudinal and/or transverse stretching, for example, in a stretching installation. In the perspective representation according to the attached figure, only some sections of the nozzle box 1 are shown. The material web is provided with broken-through areas in order better to show the nozzle box below the material web. The actual foil widths can clearly be wider than the dimensional information according to the attached drawing leads one to assume.

A gaseous treatment medium, generally air, for example for heating or cooling the foil, can be supplied in the nozzle box. In this respect, some mention is also made below of hot or cooling gas.

In the exemplary embodiment shown, the nozzle box 1 has a rectangular cross section transversely to its longitudinal extent. In principle, it comprises a multichamber system, in the exemplary embodiment shown, a first chamber 7, a second chamber 9 and a third chamber 11, which are also called supply chamber 7, pressure compensation chamber 9 and distribution chamber 11, respectively, below.

The nozzle box 1 has a supply aperture 13, which provides a connection to the supply chamber 7, only on its one end side represented in the drawing. In other words, the end side which can be seen in the drawing, i.e. the end walls of the pressure compensation chamber 2 and of the distributer chamber 3, is closed by an end wall 15.

The opposite, further end wall (not illustrated in more detail in the drawing) on the other wide side of the material web 5 is closed, with the result that the gas or treatment medium is supplied only on one side, via an end supply aperture 13, which has advantages in terms of constructional engineering.

In the longitudinal direction of the nozzle box 1, and hence in transversely to the take-up direction 3, i.e. generally perpendicularly to the take-off direction 3, there is provided at least one overflow aperture arrangement 17 which, in the exemplary embodiment shown, consists of a multiplicity of overflow apertures 17' provided along a line arranged transversely to the take-off direction 3.

Via this overflow aperture arrangement 17, the supplied gas can flow from the supply chamber 7 over the entire length of the supply chamber into the pressure compensation chamber 9.

In each case at least one overflow aperture arrangement 23 having (in the exemplary embodiment shown) a multiplicity of overflow apertures 23', which are arranged one behind another and hence transversely to the take-off direction 3, are likewise provided opposite one another on two opposite pressure-compensation chamber walls 21, via which apertures 23' the gas can flow over from the pressure compensation chamber 9 into the distribution chamber 11.

Finally, via an outlet aperture arrangement 27, the gas can emerge in the direction of the material web 5 by means of a transverse component, i.e. essentially using a component directed perpendicularly to the material web 5. The outlet aperture arrangements 27 are provided in a box wall 29 on the material-web side and, in the exemplary embodiment shown, comprise a multiplicity of outlet apertures 27' arranged in a manner such that they are offset from one another in the longitudinal and transverse direction on the box wall 29.

Finally, in the exemplary embodiment shown, the supply chamber 7 is arranged in the central region of the nozzle box 1, the distribution chamber 3 adjoining the supply chamber 7 in a spatial arrangement on that side which is remote from the material web 5.

In the exemplary embodiment shown, the distribution chamber 11 encompasses the centrally arranged supply chamber 7 and, at least partially, in that region which faces away from the material web 5, also the pressure compensation chamber 9.

It is furthermore shown in the exemplary embodiment that the distribution chamber 11 can basically be split or divided into two, i.e. by means of a partition 30 which lies in the longitudinal direction of the nozzle box 1, preferably in a vertical central longitudinal plane perpendicularly to the material web 5. Compensation apertures 31 are, however, furthermore also provided in this partition so that pressure compensation in the two parts 11a and 11b of the distribution chamber 11 takes place if necessary.

The arrangement in this case is such that, for example hot or cooling gas—generally hot or cooling air—coming from a fan is supplied to the supply aperture 13 and hence to the supply chamber 7. Since the three chambers of the blower nozzle extends virtually over the entire length of the blower nozzle, i.e. over the entire width of the material web to be treated, the treatment gas overflows over the entire length of the supply chamber, i.e. over the entire longitudinal extent of the overflow aperture arrangement 17, from the supply chamber 1 into the pressure compensation chamber 9. The gas flow is thus deflected via this overflow aperture arrangement 17 and uniformly metered over the entire length of the nozzle box. In this arrangement, the flow direction 37 through the overflow aperture arrangement 17 is transverse, i.e. perpendicular or essentially perpendicular (i.e. at an angle of 90°±≦45°, in particular 90°±≦30° or 90°±≦15° to the flow direction 35 in the supply chamber 7, the flow direction 35 running in the longitudinal direction and hence transversely (perpendicularly) to the take-off direction 3 of the material web 5.

In the pressure compensation chamber 9 pressure compensation over the entire length of the nozzle box is then possible.

The gas can then overflow via the subsequent overflow aperture arrangement 23 into the distribution chamber 11, the dynamic pressure of the gas flow being converted into stagnation pressure. This achieves a further evening out of the pressure and an even distribution of the gas flow to the outlet apertures 27'.

The overflow aperture arrangement 23 is likewise again arranged in such a manner that the flow direction 39 through this second overflow aperture arrangement 23 again transverse, i.e. essentially perpendicular to the first flow direction 35, as the gas flow overflows from the supply chamber 7 to the pressure compensation chamber 9, but also essentially comes to lie transversely to the flow direction 37. The angle of the flow direction 39 is intended likewise again to amount to approximately 90°±≦45°, in particular 90°±≦30° or 90°±≦15° to the flow direction 35 and/or 37.

Via the outlet apertures 27 the stagnation pressure in the distribution chamber 11 is then converted into dynamic pressure in the outflow apertures 27' of the distribution chamber.

The outlet flow direction 41 through the outlet apertures 27' is again likewise essentially perpendicular to the preceding flow directions 35, 37 and/or 39. In this case too the angle deviations to the perpendicular can amount to 90°±≦45°, in particular 90°±≦0° or 90°±≦15°.

The quality of distribution of the nozzle box or of the gas outlet speed in the event of differing volumetric flows can also be further improved if the individually mentioned overflow aperture arrangements 17, 23 and the outlet apertures 27' consist of holes, in particular round holes, which may, for example, be punched. This enables not only low manufacturing tolerances to be achieved but also the pitch of the hole can be very precisely configured.

A particularly low pressure loss in the blower nozzle between the fan and outlet aperture of the nozzle box can be achieved by the area ratios of the duct cross sections and of the chamber cross sections being matched to one another. As a result, the chamber geometries can also be designed in a manner which is favorable in terms of flow.

Above all, the nozzle box mentioned is extremely insensitive to changed operating temperatures.

From the cross-sectional representation of the nozzle box 1 it can also be seen that the external housing comprises a cross-sectionally rectangular nozzle box. The supply chamber 7 and the pressure compensation chamber 9 have a common housing wall which consists, for example, of a plate and surrounds the two opposite sides 21. The plate may be one which is appropriately edged and in cross section is designed in the manner of an inverted U. The two side walls 21 are thus connected via an upper connecting section 43 which is, however, located within the nozzle box 1. Only the lower ends of the side walls 21 are attached internally, in an airtight manner, to the side walls of the nozzle box 1.

Only one intermediate plate 45, in which the overflow apertures 17' are arranged, is used as a separating plate between the supply duct 7 and the connecting duct 9, this separating plate 45 likewise being fastened internally, by means of corresponding flange sections, in an airtight manner, to the opposite side walls 21.

To achieve sufficient stability use is then finally made of the abovementioned partition 30 which extends between the upper connecting section 43 of the supply duct and the inside of the box wall 29 on the material-web side and is fastened to the connecting section 43 and the box wall 29 via corresponding flange sections which in the exemplary embodiment shown protrude in the opposite direction.

Deviating from the exemplary embodiment shown, the spatial sequence of the chambers could also differ to the extent that the supply chamber 7 is situated the greatest distance away from the outlet apertures 27', and is adjoined, in the direction of the material web 5, by the pressure compensation chamber 9 and then the distribution chamber 11.

Finally, use can also be made of a chamber system which comprises more than a total of three chambers, in which rather than only one pressure compensation chamber, for example, two or more pressure compensation chambers 9 connected one after the other and having corresponding overflow aperture arrangements between the pressure compensation chambers are provided.

What is claimed is:

1. A blower nozzle for heating or cooling a material web, comprising:

an elongated nozzle housing having a longitudinal axis extending in operation in a direction transverse to a feed direction of the material web, said nozzle having an outer wall and a plurality of chamber walls provided within said outer wall to define a plurality of chambers for determining a flow path of a treatment gas through said housing, said chambers including a first, supply chamber for receiving treatment gas and for supplying said treatment gas to a remainder of said chambers, at least one second chamber for receiving treatment gas from said supply chamber via a first aperture arrangement provided between the supply chamber and said at least one second chamber, and a third, distribution chamber for receiving treatment gas flowing from said at least one second chamber via a second aperture arrangement, wherein said third, distribution chamber extends in a direction transverse to the feed direction of the material web and wherein a third aperture arrangement is defined through an outlet portion of said outer wall and in communication with said distribution chamber so that flow therethrough is in a direction generally transverse to the feed direction of the material web, said third aperture arrangement being defined to extend over substantially an entire width of the material web.

2. A blower nozzle according to claim 1, wherein each of said first and said second aperture arrangements extend over at least one of substantially the entire width of the material web and essentially over an entire length of the nozzle housing.

3. A blower nozzle according to claim 1, wherein each of said first and said second aperture arrangements comprises at least one slotted recess.

4. A blower nozzle according to claim 1, wherein each of said first and said second aperture arrangements comprise a plurality of round holes.

5. A blower nozzle according to claim 4, wherein each said plurality of round holes is oriented in at least one line extending in the longitudinal direction of the nozzle housing and such that the lines are laterally offset from one another.

6. A blower nozzle according to claim 1, wherein the nozzle housing has first and second longitudinal ends and further comprising a supply aperture for supplying treatment gas to said first, supply chamber via solely one of said two longitudinal ends.

7. A blower nozzle according to claim 1, wherein a flow direction of treatment gas from said first, supply chamber into said at least one second chamber is generally transverse to a flow direction along which treatment gas flows in said first, supply chamber.

8. A blower nozzle according to claim 1, wherein a treatment gas flow direction from said at least one second chamber to said third, distribution chamber is generally transverse to a flow direction along which the treatment gas flows in the first, supply chamber.

9. A blower nozzle according to claim 1, wherein said third aperture arrangement is oriented so that the flow direction out of the third, distribution chamber is generally transverse to the flow direction from said at least one second chamber into said third, distribution chamber.

10. A blower nozzle according to claim 7, wherein the directions of flow from said first, supply chamber to said second chamber, from said second chamber to said third chamber, and out from said third chamber are each disposed generally transverse to one another so that the respective flow directions are inclined to one another by an angle of between about 45° and 135°.

11. A blower nozzle according to claim 1, further comprising a partition wall dividing said third, distribution chamber into a first distribution chamber part and a second distribution chamber part, each said chamber part extending in a width wise direction generally perpendicularly to said outlet portion of said outer wall in which said third aperture arrangement is defined.

12. A blower nozzle according to claim 11, wherein a plurality of compensation apertures are defined through said partition wall.

13. A blower nozzle according to claim 1, wherein the distribution chamber overlaps at least a portion of at least one of said first, supply chamber and said second chamber.

14. A blower nozzle according to claim 1, wherein said second aperture arrangement is provided in each of first and second chamber walls defined between said at least one second chamber and said third, distribution chamber, said first and second chamber walls being offset in the feed direction of the material web and each extend in a direction generally transverse to the material web.

15. A blower nozzle according to claim 1, wherein said at least one second chamber is disposed on a diametrically opposite side of said first, supply chamber with respect to said outlet portion of said outer wall.

16. A blower nozzle according to claim 1, wherein said at least one second chamber is disposed on a side of said first, supply chamber that faces the third aperture arrangement.

17. A blower nozzle according to claim 1, wherein said plurality of chamber walls include first and second chamber walls defining side walls of the first, supply chamber and of the at least one second chamber, said first and second chamber walls diverging away from one another in a direction away from said outlet portion of said outer wall.

18. A blower nozzle according to claim 1, wherein said at least one second chamber comprises a pressure compensation chamber for receiving treatment gas from said supply chamber and directing said treatment gas to said distribution chamber.

\* \* \* \* \*